United States Patent [19]

Valentine

[11] 4,003,140
[45] Jan. 18, 1977

[54] EDUCATIONAL DEVICE FOR LEARNING ENGINE FUEL, LUBRICATION AND COOLING SYSTEMS

[75] Inventor: Charles G. Valentine, Stamford, Conn.

[73] Assignee: Xerox Corporation, Stamford, Conn.

[22] Filed: Apr. 27, 1973

[21] Appl. No.: 355,135

[52] U.S. Cl. .............................................. 35/13
[51] Int. Cl.² ........................................ G09B 25/02
[58] Field of Search ............... 35/7 A, 10, 13, 19 A

[56] References Cited

UNITED STATES PATENTS

| | | | |
|---|---|---|---|
| 2,893,137 | 7/1959 | Alling | 35/19 A |
| 2,917,834 | 12/1959 | Butler | 35/19 A X |
| 3,077,696 | 2/1963 | Barnett | 35/19 A X |
| 3,080,664 | 3/1963 | Bland | 35/7 A X |
| 3,245,156 | 4/1966 | Bloois | 35/8 A |
| 3,423,846 | 1/1969 | Arend | 35/19 A |
| 3,520,074 | 7/1970 | Severin | 35/48 R |

OTHER PUBLICATIONS

Project Physics Course, Descriptive Catalog from Holt, Rinehart & Winston, p. 2, Rec'd. Sept. 22, 1972.

*Primary Examiner*—Harland S. Skogquist

[57] ABSTRACT

An educational kit for teaching fuel, engine lubrication, and engine cooling systems of an automobile engine is disclosed. The kit comprises audiovisual instructional means, a simulator board upon which is graphically depicted indicia representing a schematic sectional diagram of an automobile engine block, and a plurality of manipulative pieces upon which are graphically depicted indicia representative of various of the component parts of the automobile engine fuel, lubrication or cooling systems. The pieces are adapted for manipulation on the simulator board in association with the indicia printed thereon whereby the user of the kit may graphically depict and physically construct a simulation of the automotive subsystems under study.

5 Claims, 7 Drawing Figures

AUDIO VISUAL MEANS

WORK SHEETS

EDUCATIONAL DEVICE FOR LEARNING ENGINE FUEL, LUBRICATION AND COOLING SYSTEMS

BACKGROUND OF THE INVENTION

The present invention relates to an educational kit designed for training in automotive technology. More specifically, the invention deals with an educational learning kit designed to help students of automotive technology understand the assembly, relationship of parts and operation of an automobile engine fuel, cooling and lubrication system.

The automobile is a fairly complex piece of machinery constructed from many complex subsystems. When these subsystems are operating properly and cooperating with one another as they should, a pleasurable drive in the country is there but for the taking. However, when one or more of these subsystems malfunctions, a pleasurable drive in the country often becomes both a regrettable experience for the automobile owner and a delight to the automobile repairman.

Traditionally, an individual interested in automobile technology might avail himself of the opportunity to acquire the skills necessary for the occupation of automobile mechanic or repairman by any one of a number of routes. Often, such skills are acquired by attending trade schools, by taking courses in automotive technology, through military service training, by simple on-the-job training, or by self-training. Regardless of the route taken, the first goal which should be achieved is an understanding of the automobile and its compoment subsystems, and how each of these subsystems cooperate with one another to achieve a desired result. A second goal is an understanding of specific subsystems, including how they operate, what parts make up the subsystems, how these parts are assembled and how these parts relate to one another. once these goals have been achieved, the individual is better equipped for training in diagnosis and repair of the various malfunctions occurring in automobile subsystems.

At some point during the learning process, it is most desirable that the student of automobile repair extend beyond charts, manuals or diagrams and be afforded the opportunity to see, examine and manipulate the actual subsystem under study or a model thereof. Physical exposure to the subsystem and its component parts aids the student in better understanding what he hears or reads about it, and complements the learning process by permitting him to inspect, manipulate and arrange the various parts.

Recent years have marked the introduction of a number of educational teaching devices generally aimed at the pre-college or pre-high school age group. The most common of these are the mechanical or computer devices designed to be used by individual students. The theory behind the increasing use of such devices is that account is made of the individual differences in ability, speed and grasp of subject matter, thereby permitting the student to learn at his own pace with minimum supervision by the teacher. Some of these devices also introduce new dimensions into the learning process wherein, for example, spelling may be associated with pictures of objects, mathematical concepts associated with the relative sizes and shapes of objects, or correct responses to questions posed by a computer rewarded by permission to proceed.

The advantages of a teaching method using a device geared for the individual should not be considered restricted to elementary school subjects; occupational learning materials that take into account individual differences in ability, speed and grasp of subject matter also have a better chance of being effective. However, at the present time there are very few educational devices available to the community colleges, vocational high schools and other special schools where various types of mechanical and electrical technologies are sought to be taught on a simplified and individualized basis. There is a great need for occupational learning devices which can be used by the individual student while learning a particular technology and which permit the student to physically simulate the construction or arrangement of parts or concepts involved in the particular systems or subsystems under study prior to examination of the actual system or subsystem.

Accordingly, it is an object of this invention to provide a novel approach toward the learning of automobile systems and subsystems.

Another object is to provide an educational kit comprising instructional means and simulator means for teaching the fundamentals of an automobile engine fuel, lubrication and cooling systems.

Another object is to provide an occupational educational kit which is simple, relatively inexpensive, rugged, easily assembled, relatively portable and easily understood.

Another object is to provide an educational kit designed for use by individual students comprising audio, visual or audio-visual instruction means, a simulator board bearing graphic indicia, and a plurality of manipulative pieces bearing graphic indicia representative of the various parts of an automobile engine fuel, lubrication and cooling system, whereby the student may manipulate the pieces on the simulator board in response to said instructional means to graphically depict the assembly, relationship of parts and operation of these automobile subsystems.

SUMMARY OF THE INVENTION

In accordance with the teachings of the present invention, a simple and effective educational kit for the teaching of the assembly, relationship of parts and operation of an automobile engine fuel, lubrication and cooling systems is provided. The kit comprises an instructional means, a simulator board upon which is graphically depicted a schematic sectional view of an automobile engine block, and a plurality of pieces upon which are graphically depicted various of the major parts and connections which constitute or are a part of the automobile systems mentioned above. The kit may also comprise a display board which provides for storage and easy access to the various pieces when the kit is in use. The kit is designed to present the fundamentals of the function and mechanism of automobile engine fuel, lubrication and cooling systems using a programmed, multimedia approach whereby the student hears and sees information, performs by answering questions, solving problems and manipulating objects. The kit designed for individual use or use by small groups without the need for extensive supervision or participation by an instructor. It permits the student to learn at his own pace, and also affords him the chance to capitalize on the way he learns best because he participates in different kinds of learning experiences. He listens to information while viewing a series of related visuals and participates in a manipulative activity which gives him a chance to try doing himself what he has been shown or told how to do. He is thus totally involved in the learning process.

DETAILED DESCRIPTION OF THE INVENTION

The instructional means employed in the kit is an audiovisual presentation using slides or filmstrips in conjunction with a descriptive audio account of the visuals. The visual materials are synchronized with the audio presentation. A recorded narrator provides background information descriptive of the various components of the automobile fuel system such as the fuel lines, the fuel pump and the carburetor, or of the engine lubrication system such as the oil pump, oil filter and oil galleries, or of the cooling system such as the radiator, water pump and connecting hoses. During this audio presentation, a series of synchronized related visuals are shown to the students. These visuals comprise photographs or diagrams of the various components of the subsystems which are being described in the audio presentation mentioned above.

The audiovisual supporting equipment needed will vary depending on the type of instruction to be given. A rear screen projector for small groups, or a projector and screen for a classroom presentation may be used. For the audio presentation either visual projection equipment with built-in audio capability or a separate cassette recorder may be used. The instructional means provided with the educational kit includes a visual segment available, for example, on 35 mm slides or filmstrips, and an audio segment available on cassettes. The supporting equipment is normally not included in the kit.

As various points during the presentation the student is requested to stop the audiovisual presentation and perform certain activities using the simulator board and pieces associated therewith. He may be requested to assemble a series of pieces representative of engine parts or connections in accordance with a pictured diagram or to manipulate and arrange the various pieces within the engine block depicted on the simulator board to show where these parts are normally located, how they relate to one another, how they function, and how they are connected. The simulator activity thus allows a student to use his hands as a learning tool, as well as his eyes and ears. By performing an activity using the simulator board and its accessories, the student takes an active part in the learning process and achieves understanding more quickly.

The simulator board and the accessories are best described with reference to the attached drawings.

DETAILED DESCRIPTION OF THE DRAWINGS

Figure 1:
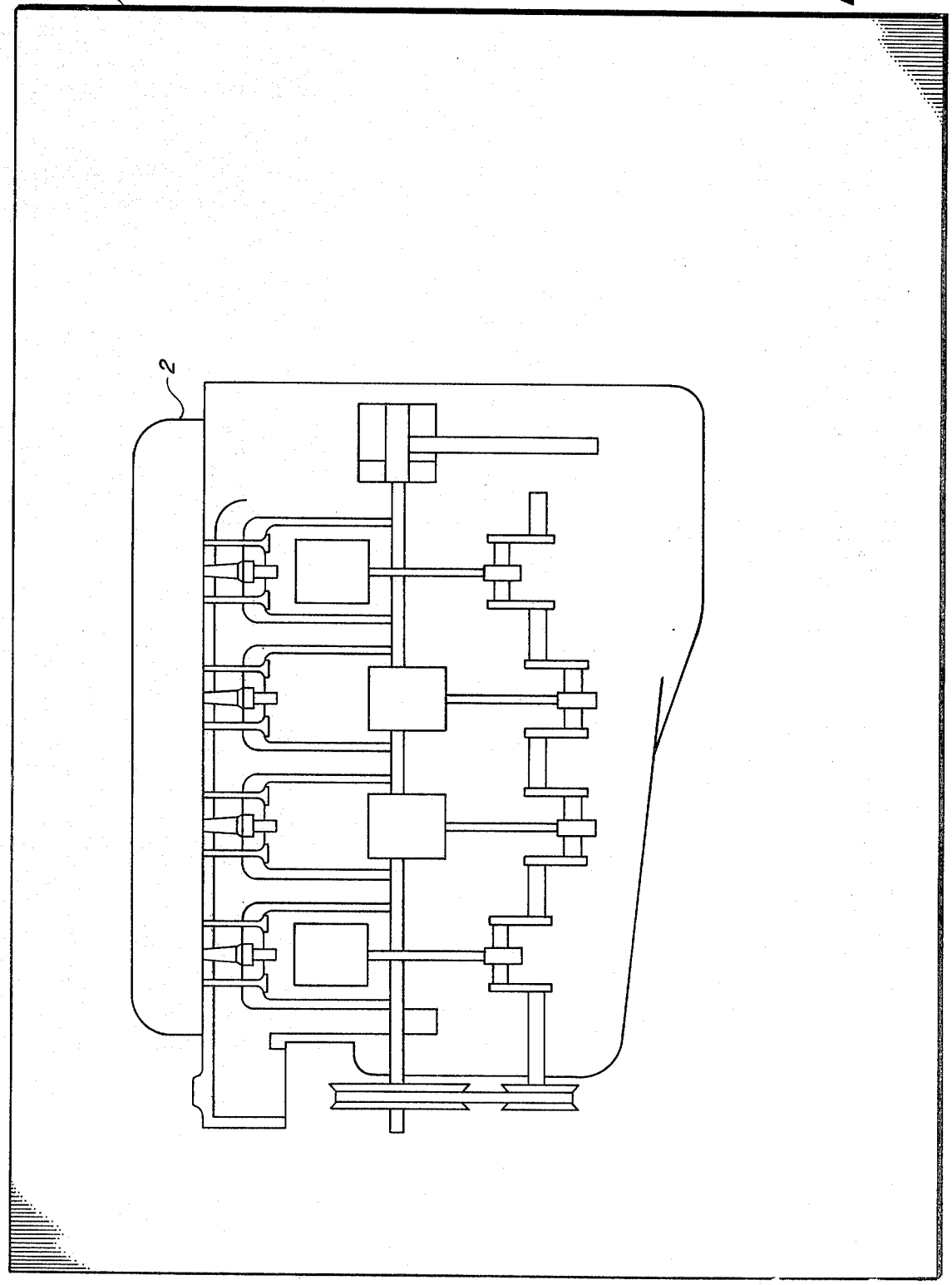
FIG. 1 is a plan view of the simulator board with graphic indicia thereon.

In FIG. 1, the simulator board 1 is shown having printed thereon graphic indicia 2 representative of a schematic sectional view of an automobile engine block. Included within the indicia are schematic representations of the cylinders, the pistons, connecting rods, crankshaft, camshaft, valves and spark plugs. The simulator board may be constructed of a magnetically attractive sheet of rigid material such as ferrous metal or a magnetic ferrite plastic, or a thin sheet of ferrous metal coated with a thin layer of plastic material. The surface of the board is painted with a neutral background color such as a white or yellow enamel. The graphic indicia present on the board may be printed over the enamel in a suitable contrasting color such as black. Printing may be accomplished by any suitable means such as, for example, a silk screening process. Alternatively, the indicia may be printed on a sheet of clear plastic adapted to be superimposed over a blank board. Although the simulator board may consist solely of a thin sheet of material with suitably smooth edges, the sheet is preferably laminated to a suitable backing member which imparts suitable rigidity thereto. Thus, in the preferred embodiment the simulator board comprises a thin sheet comprising ferrous metal having a thickness of about 1/32 inch laminated to a backing member made from a rigid material such as, fiberboard, or a resinous material, said backing material having a preferred thickness of about ¼ inch. The dimensions of the simulator board should be such that the board can be conveniently used by the student at a given workplace. Boards having dimensions of about 15 × 20 inches, or approximately 300 square inches, are particularly suitable.

Figure 2:
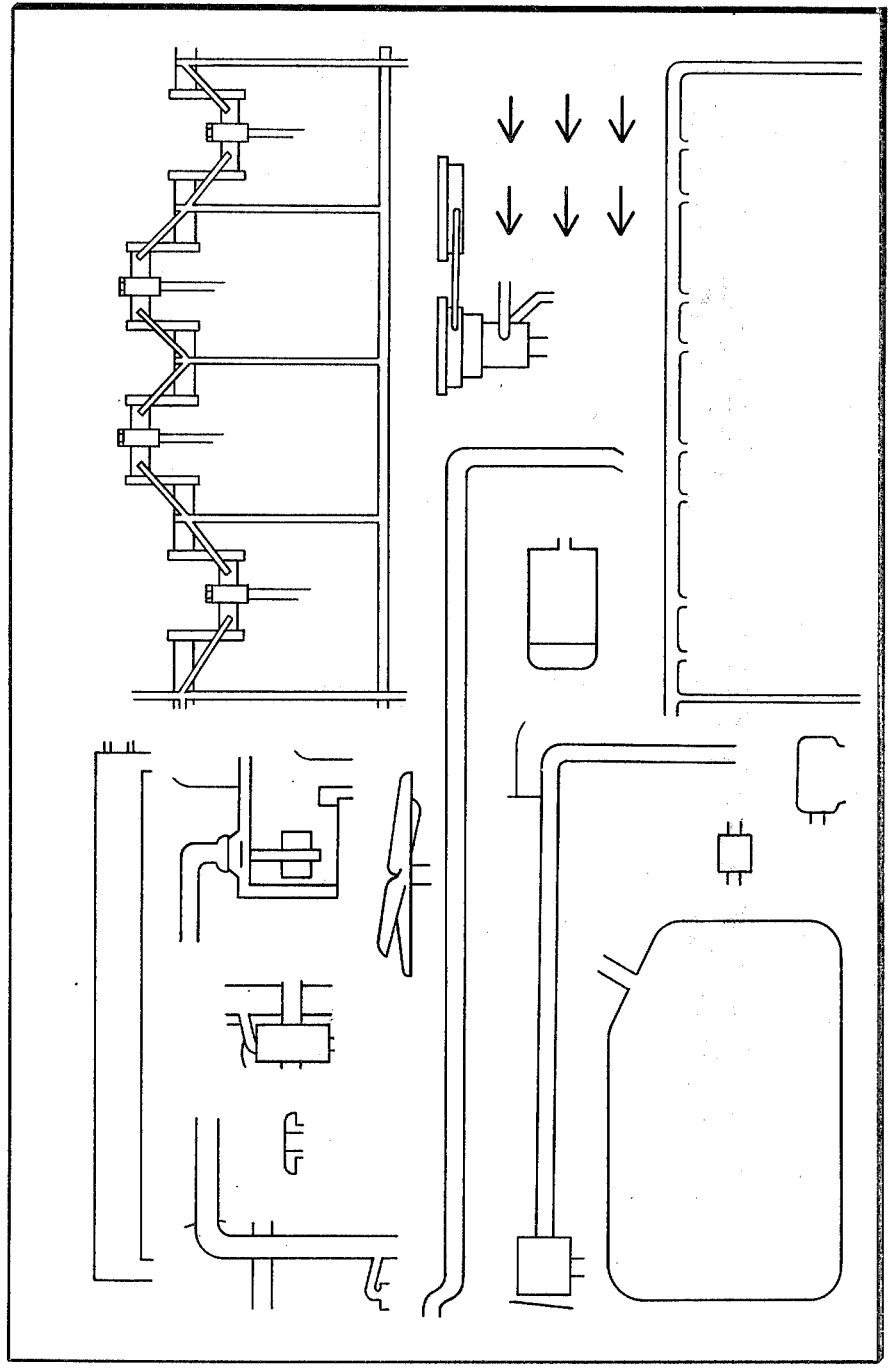
FIG. 2 is a plan view of the display board with graphic indicia thereon.

In FIG. 2 a display board is shown having printed thereon graphic indicia representative of the various component parts and connections of automobile engine fuel, lubrication and cooling systems. The display board is also constructed of a magnetically attractive rigid material similar to the simulator board and the background and indicia may be printed thereon in the same way. The purpose of the display board is to serve as a display and storage area for the magnetically attractive pieces which are used in conjunction with the simulator board. Each of the graphic indicia printed on the display board corresponds to the indicia printed on one of the pieces, thereby facilitating systematic storage and display of the pieces and allowing for quick inspection to determine that all of the pieces are accounted for. The edges of the board should be either smooth or rolled over to prevent injury from sharp edges.

Figure 3:
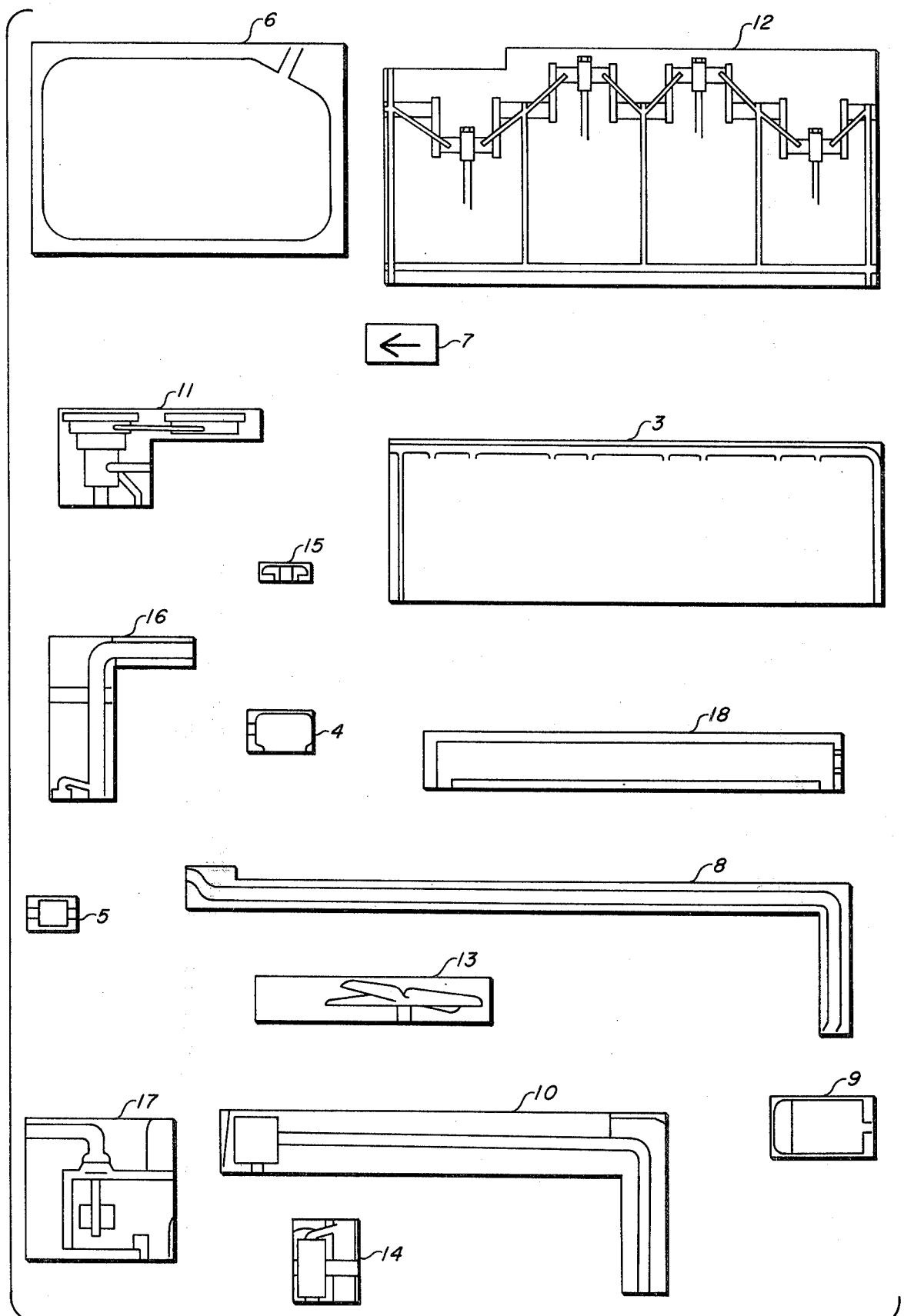
FIG. 3 is a plan view of the manipulative pieces having graphic indicia thereon representative of the various component parts and connections of automobile engine fuel, lubrication and cooling systems.
Figure 4:
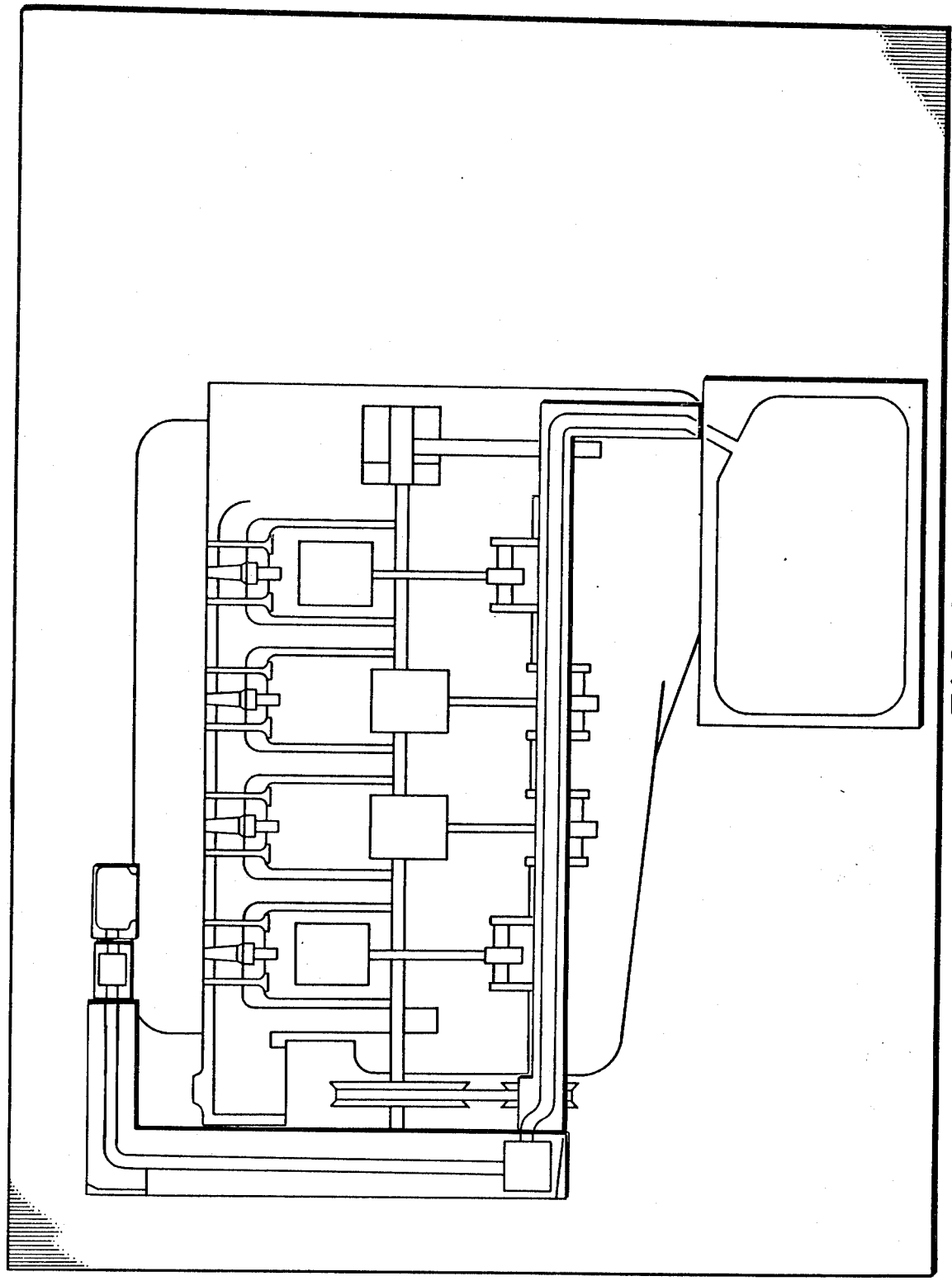
FIG. 4 is a plan view of the simulator board with certain of the manipulative pieces in place.
Figure 5:
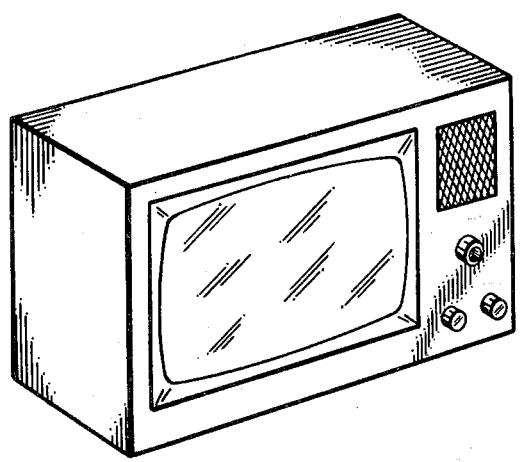
FIG. 5 illustrates generally an audiovisual device suitable for use in the present invention.
Figure 6:
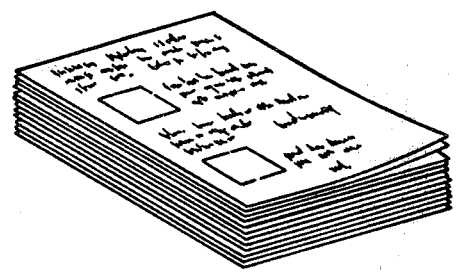
FIG. 6 illustrates generally worksheets in accordance with the present invention.
Figure 7:
FIG. 7 is a side-sectioned view of a typical manipulative piece in accordance with the invention showing smaller magnetic sections laminated to the underside of the piece.

The manipulative pieces used in the educational kit are shown in FIG. 3. Each of these pieces consists of a flat sheet of a rigid material such as metal or plastic, upon which is printed one of several indicia representative of the various component parts and connections of automobile engine fuel, lubrication and cooling system. In the preferred embodiment, the pieces are made of a plastic material such as polyvinyl chloride having a thickness of about 1/16 inch and having smaller sections of a magnetically attractive material laminated to the underside thereof. The smaller sections also serve to provide a gap between the piece and the surface upon which it is resting to facilitate gripping and manipulation of the pieces on flat surfaces. The pieces bear indicia representing the oil feed lines 3, the carburetor 4, the fuel filter 5, the fuel tank 6, the fuel line connecting the fuel tank to the fuel pump 8, the oil filter 9, the fuel pump and associated fuel line 10, the oil pump 11, a piece depicting a schematic of the crankshaft and associated oil galleries or feed lines 12, the radiate fan 13, the water pump 14, the radiator cap 15, the lower radiator hose 16, the upper radiator hose with associated thermostat 17 and the radiator 18. Also included are a plurality of pieces one of which is shown at 7 having arrows thereon which may be used to depict the direction of fluid flow. The size and shape of the pieces is such that they fit and can be manipulated within the confines of the simulator board indicia and at the appropriate locations. The pieces are not all used at the same time, but rather selected pieces are used to simulate a particular subsystem under investigation. For example, pieces 4, 5, 6, 8 and 10 are designed to be used together to simulate the fuel feed system as shown in FIG. 4. Accordingly, the fuel line connections and parts graphically depicted on these pieces will connect when the pieces are properly assembled according to instruction. In the same manner, the engine lubrication system may be depicted by proper placement and assembly of pieces 3, 9, 11, and 12. The cooling system may be depicted by proper placement and assembly of pieces 13 through 18. Other possible combinations of pieces will be apparent to the user of the device with the instructional means, simulator board and pieces before him.

In FIG. 4 the simulator board is depicted with some of the pieces in place. The pieces show the fuel system with pieces representative of the gas tank, fuel line, fuel pump, fuel filter and carburetor in place.

As indicated above, the surfaces of the simulator board, the display board and at least the bases of the manipulative pieces are made from or contain a magnetically attractive material. The term magnetically attractive material is intended to encompass a material that is either itself magnetic or a material that is attracted to a magnet. Thus, where the surface of the boards is magnetic, the bases of the pieces need only be of a material that is attracted to a magnet. In the simpler and preferred embodiment, the bases of the pieces have laminated thereto a section of a magnetic material such as magnetic plastic or metal, and the boards are made of material that is attractive to a magnet such as galvanized steel.

All of the above materials are most conveniently supplied housed in a compartmentalized case for easy use and storage. Thus, the educational kit includes the simulator board, the display board, the manipulative pieces, the visual slides or tapes and the audio cassette. The kit may also include student work sheets, sample tests or quizzes to be given by the instructor before and after use of the unit and an instructor's manual.

To illustrate how the educational kit might be used, the audiovisual presentation begins with a discussion of the engine lubrication system and the component parts thereof. The discussion includes a recitation of the various engine parts that need lubrication and the reasons why lubrication is needed. The instructional material is presented to the student by means of the visual slides and a synchronized audio presentation. At certain points during the presentation, the student is asked to switch to the simulator board and related accessories and reconstruct an assembly of parts and connections which have been depicted in a visual segment of the presentation. For example, the student might be asked to select the pieces representative of the oil feed lines, the oil filter, the oil pump and the crankshaft with oil galleries and position the pieces at the correct locations within the indicia present on the simulator board. By proper placement of these pieces the student can depict how oil is pumped throughout the engine and the various locations in the engine where oil is supplied. After additional instruction via the audiovisual means of the fuel system and the component parts thereof, the student might then be asked to select and position the pieces which are representative of the various components of the fuel system such as the gas tank, the carburetor, the fuel pump, and the like. In like manner, the engine cooling system is then discussed and once again the student is asked to select and position the various pieces which represent the parts and connections involved in the cooling system according to a pictured diagram or according to audio instruction. Each of these automotive subsystems may be depicted by selecting the proper pieces and manipulating them on the simulator board as per instruction. The simulator board and the accessory pieces thus permit the student to actually construct the various fuel, lubrication, and cooling systems which are being taught to him and thereby demonstrate his understanding of the assembly, relationship of parts and operation of these various subsystems.

The above-described kit is programmed such that the student encounters a minimum of frustration and a maximum of learning efficiency. Upon completion of the unit, the student should be able to describe in one paragraph or less a lubricating system, a fuel system, or a cooling system. He should be able to define in one sentence or less the terms viscosity, viscosity number designation, characteristics of the lubricating oil such as thick or thin, tendency to flow, and ambient temperature range applications. He should be able to name the seven major componets of the liquid cooling system and give a one-sentence description of each component. He should also be able to state the four main functions of a lubricating oil, state the purpose and function of an oil pump and list the two most common types. He should also be able to list at least two methods of driving a fuel pump, and list at least five major components of the common type of fuel system.

A complete description of the above-described educational kit is found in a booklet entitled "Automotive Technology — Engine Fuel, Lubrication and Cooling Systems" (Unit 10069-80) published as part of the Occupational Technology Series by the Xerox Corporation.

What is claimed is:

1. An educational kit programmed for teaching automobile fuel, engine lubrication, and engine cooling systems comprising as integrated component parts thereof:

a. a simulator board having a surface of magnetically attractive material and including graphic indicia on the surface thereof defining a schematic sectional diagram of an automobile engine block, the indicia on said simulator board being as shown by the non-numerical indicia of FIG. 1;

b. a plurality of magnetically attractive manipulative pieces individually bearing on their surfaces specific graphic indicia defining schematic representative diagrams of automobile engine fuel, lubrication, or cooling system component parts, said pieces adapted for positioning on said simulator board such that the indicia on said pieces complements the indicia on said board and the indicia on each of the several pieces coacts with the indicia on other pieces to form completed schematic diagrams of automobile fuel, lubrication or cooling systems;

said magnetically attractive board or alternatively each of said magnetically attractive pieces being magnetic to provide a mutual attraction between said board and said pieces, the indicia on said manipulative pieces being as shown by the non-numerical indicia of FIG. 3; and c. audio-visual instructional means including synchronized recordings and visual slides or filmstrips presenting information relevant to the automotive systems including information defining the relationship between the indicia on said pieces and the indicia on said simulator board;

said audio-visual instructional means further characterized in that it is periodically stopable to permit the user to perform a manipulative activity requested by the instructional means using said simulator board and said manipulative pieces, and being restartable again by the user upon completion of the activity;

d. a display board for said manipulative pieces including a sheet of magnetically attractive material, said display board having graphic indicia on a surface thereof in spaced relationship, said graphic indicia corresponding to the indicia present on each of said manipulative pieces, said manipulative pieces adapted for storage on and removal from said display board.

2. An educational kit according to claim 1 wherein said instruction means includes a plurality of student worksheets, said worksheets being adapted for use by the student to record information and test the student in response to said audiovisual instruction means.

3. An educational kit according to claim 1 wherein said manipulative pieces are magnetic.

4. An educational kit according to claim 3 wherein said manipulative pieces comprise a flat sheet of rigid material having smaller sections of a magnetic material laminated thereto.

5. An educational kit according to claim 1 wherein the indicia depicted on said simulator board includes schematic representations of automobile engine cylinders, pistons, connecting rods, the crankshaft, camshaft, valves and spark plugs.

* * * * *